United States Patent
Vale (10) Patent No.: US 11,326,826 B2
(45) Date of Patent: May 10, 2022

(54) BLAST GEL PACK CONDITIONING EQUIPMENT

(71) Applicant: World Courier Management Limited, London (GB)

(72) Inventor: Alexandre Dantas Vale, Sao Paulo (BR)

(73) Assignee: World Courier Management Limited, London (GB)

( * ) Notice: Subject to any disclaimer, the term of this patent is extended or adjusted under 35 U.S.C. 154(b) by 111 days.

(21) Appl. No.: 16/711,477

(22) Filed: Dec. 12, 2019

(65) Prior Publication Data
US 2020/0191463 A1   Jun. 18, 2020

Related U.S. Application Data

(60) Provisional application No. 62/779,174, filed on Dec. 13, 2018.

(51) Int. Cl.
*F25D 13/06* (2006.01)
*G01K 13/00* (2021.01)
*F25D 29/00* (2006.01)

(52) U.S. Cl.
CPC ........... *F25D 13/067* (2013.01); *F25D 29/00* (2013.01); *G01K 13/00* (2013.01);
(Continued)

(58) Field of Classification Search
CPC .. F25D 13/067; F25D 2400/20; F25D 17/067; F25D 17/045; F25D 29/00;
(Continued)

(56) References Cited

U.S. PATENT DOCUMENTS

| | | | |
|---|---|---|---|
| 4,637,222 A | | 1/1987 | Fujiwara et al. |
| 5,297,234 A | * | 3/1994 | Harms .................... A23L 3/365 392/379 |

(Continued)

FOREIGN PATENT DOCUMENTS

| | | |
|---|---|---|
| DE | 3032865 A1 | 4/1982 |
| DE | 102005029907 A1 | 1/2007 |
| GB | 2514622 A | 12/2014 |

OTHER PUBLICATIONS

International Search Report and Written Opinion for corresponding International Application No. PCT/IB2019/001300, dated Apr. 30, 2020.

*Primary Examiner* — Cassey D Bauer
(74) *Attorney, Agent, or Firm* — Howson & Howson LLP (57) ABSTRACT

Automated blast gel pack conditioning equipment is provided and includes a housing with an evaporator and heater and defining a void space for containing a set of gel packs, at least one fan for circulating air within the housing such that a path of air flow extends through an air insufflation end to an air return end within the housing, at least one temperature sensor located within the housing, and a controller for receiving temperature measurements from the at least one temperature sensor and for automatically controlling operation of the evaporator, heater, and fans during phase change processing and conditioning of gel packs. A method of phase change processing and conditioning gel packs and a temperature sensor assembly are also provided.

22 Claims, 8 Drawing Sheets

(52) U.S. Cl.
CPC ...... *F25D 2400/02* (2013.01); *F25D 2700/12* (2013.01); *F25D 2700/123* (2013.01); *F25D 2700/16* (2013.01)

(58) Field of Classification Search
CPC ........... F25D 2700/12; F25D 2700/123; F25D 2700/16; F25D 17/005; F25D 17/04; F25D 31/005; B64D 11/04; B64D 2013/0629; F24F 13/04; G01K 13/00
See application file for complete search history.

(56) References Cited

U.S. PATENT DOCUMENTS

| | | |
|---|---|---|
| 6,482,332 B1 | 11/2002 | Malach |
| 7,748,228 B2 | 7/2010 | Walker et al. |
| 7,908,870 B2 | 3/2011 | Williams et al. |
| 2005/0011202 A1* | 1/2005 | Voute ................ F25D 25/00 62/66 |
| 2007/0028642 A1 | 2/2007 | Glade et al. |
| 2014/0151382 A1 | 6/2014 | White et al. |
| 2014/0311170 A1 | 10/2014 | Mills et al. |
| 2017/0071784 A1 | 3/2017 | Brobeck |

* cited by examiner

BLAST GEL PACK CONDITIONING EQUIPMENT

CROSS REFERENCE TO RELATED APPLICATIONS

This application claims the benefit under 35 USC § 119(e) of U.S. Provisional Patent Application No. 62/779,174, filed Dec. 13, 2018.

BACKGROUND

In the transport of pharmaceutical and other temperature sensitive products such as vaccines and the like, special multi-walled packaging or shipping containers may be used in which gel packs are arranged about inner boxes or the like of the packaging. The gel packs provide a thermal battery to absorb or release heat during the transit of the packaging that otherwise may become exposed to ambient hot or cold temperatures depending on geographic region of the shipment and season thereof.

Gel packs are typically filled with water, phase change material (PCM), or other fluids and may be conditioned (frozen, cooled, heated) to a pre-determined temperature and stabilized at the pre-determined temperature before use. A phase change material (PCM) is a substance with a high heat of fusion which, melting and solidifying at a certain temperature, is capable of storing and releasing large amounts of energy.

Packaging and shipment of different pharmaceutical products may require gel packs conditioned and stabilized at a variety of different temperatures. In addition, gel packs conditioned at different temperatures may be used within the same packaging at different locations within the packaging. By way of example and not by way of limitation, packaging may require, for instance, the use of gel packs frozen at −20° C. (−4° F.) arranged at some locations within the packaging and gel packs refrigerated at +5° C. (41° F.) arranged at other locations within the packaging.

For purposes of assuring proper performance of such packaging, it is imperative to prepare the material within the gel packs to be solid, liquid, or a mixture of part solid and part liquid and at a specific desired temperature to assure a range of internal enthalpy (internal energy related to sensible and latent heat) of the gel pack. The packaging must perform similar to tests performed during the qualification of the packaging and process of preparing and assembling the packaging with conditioned and stabilized gel packs.

Standalone equipment or walk-in areas maintained at controlled temperatures may be used to condition gel packs. For example, gel packs may be frozen in freezer units at very low temperatures (i.e., below 0° C. (32° F.)), cooled in refrigerator units at relatively cool temperatures (i. e., about +2 to +8° C. (35.6 to 46.4° F.), and/or warmed or heated in incubator units or ambient areas (i. e., for temperatures from +15 to +30° C. (59 to 86° F.)). Typically, the gel packs are permitted to remain at any of the above referenced areas for predetermined and extended periods of time to condition the gel packs and prepare the gel packs for use in shipment packaging. Depending upon the equipment used and the gel pack to be conditioned, conditioning times required to stabilize the temperature of the gel packs can require, for instance, as many as five days.

By way of further specific examples, PCM gel packs needed for ambient shipments may be conditioned by being maintained at an ambient temperature for at least 24 hours to stabilize the temperature of the gel packs before use. PCM gel packs needed for refrigerated shipments may be conditioned by being frozen in a freezer for 24 hours and then placed in a refrigerator (at a temperature slightly below freezing) for at least 24 hours to stabilize the temperature of the gel packs before use (i.e., for 48 total hours of conditioning). PCM gel packs needed for frozen shipments and water-based gel packs needed for refrigerated shipments may be conditioned by being frozen in a freezer for 72 hours to stabilize the temperature of the gel packs before use. For some larger scale conditioning operations, an additional 4 to 24 hours of pre-cooling in a freezer or blast freezer (i.e., a freezer in which cold air is circulated by blowers) may be added to the above conditioning times.

SUMMARY

According to an embodiment, automated blast gel pack conditioning equipment is provided. The conditioning equipment includes a housing with an evaporator and heater for defining a void space for containing a set of gel packs, at least one fan for circulating air within the housing such that a path of air flow extends through an air insufflation end to an air return end, at least one temperature sensor located within the housing, and a controller for receiving temperature measurements from the at least one temperature sensor and for automatically controlling operation of the evaporator, heater, and fans during phase change processing (i.e., freezing or melting) and conditioning of gel packs.

According to another embodiment, a temperature sensor for PCM gel pack conditioning equipment is provided. The sensor includes a pot-shaped container filled with paraffin with a temperature sensor positioned against an inner wall of the pot-shaped container on an outer periphery of the paraffin.

According to a further embodiment, a method of automatically phase change processing (i.e., freezing or melting) and conditioning gel packs is provided. The method includes the steps of phase change processing a set of gel packs within blast gel pack conditioning equipment and, immediately following the phase change processing step without removing the set of gel packs from the blast gel pack conditioning equipment, conditioning the set of gel packs to a pre-determined specific temperature in order to adjust the sensible heat. The blast gel pack conditioning equipment includes a housing with an evaporator and heater, at least one fan for circulating air within the housing such that a path of air flow extends through an air insufflation end to an air return end, at least one temperature sensor located within the housing, and a controller for automatically receiving temperature measurements from the at least one temperature sensor and for automatically controlling operation of the evaporator, heater, and fans within the housing during the phase change processing and conditioning steps.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to embodiments, automated blast gel pack conditioning equipment providing relatively high-speed airflow and low or high treatment temperatures is used for the purpose of reducing time during phase change processing of a set of gel packs. As used herein, the term "phase change processing" refers to a process in which some or all of the phase change material of a gel pack changes from one state to another, such as, processes of freezing a liquid to a solid state and of melting a solid to a liquid state. In addition, the high-speed air-flow and/or a heating and/or cooling system in the blast gel pack conditioning equipment is used to reduce the time needed to condition and stabilize the temperature of the gel packs at a final desired temperature. Accordingly, embodiments disclosed herein are able to reduce an overall time of a conditioning process of a set of gel packs, such as PCM gel packs.

According to embodiments, the automated blast gel pack conditioning equipment may include a customized controller to run the complete process of gel pack phase change processing and/or conditioning within the same unit at reduced process times by taking advantage of high-speed airflow, a powerful refrigeration system, and a heating system within the same unit.

Figure 1:
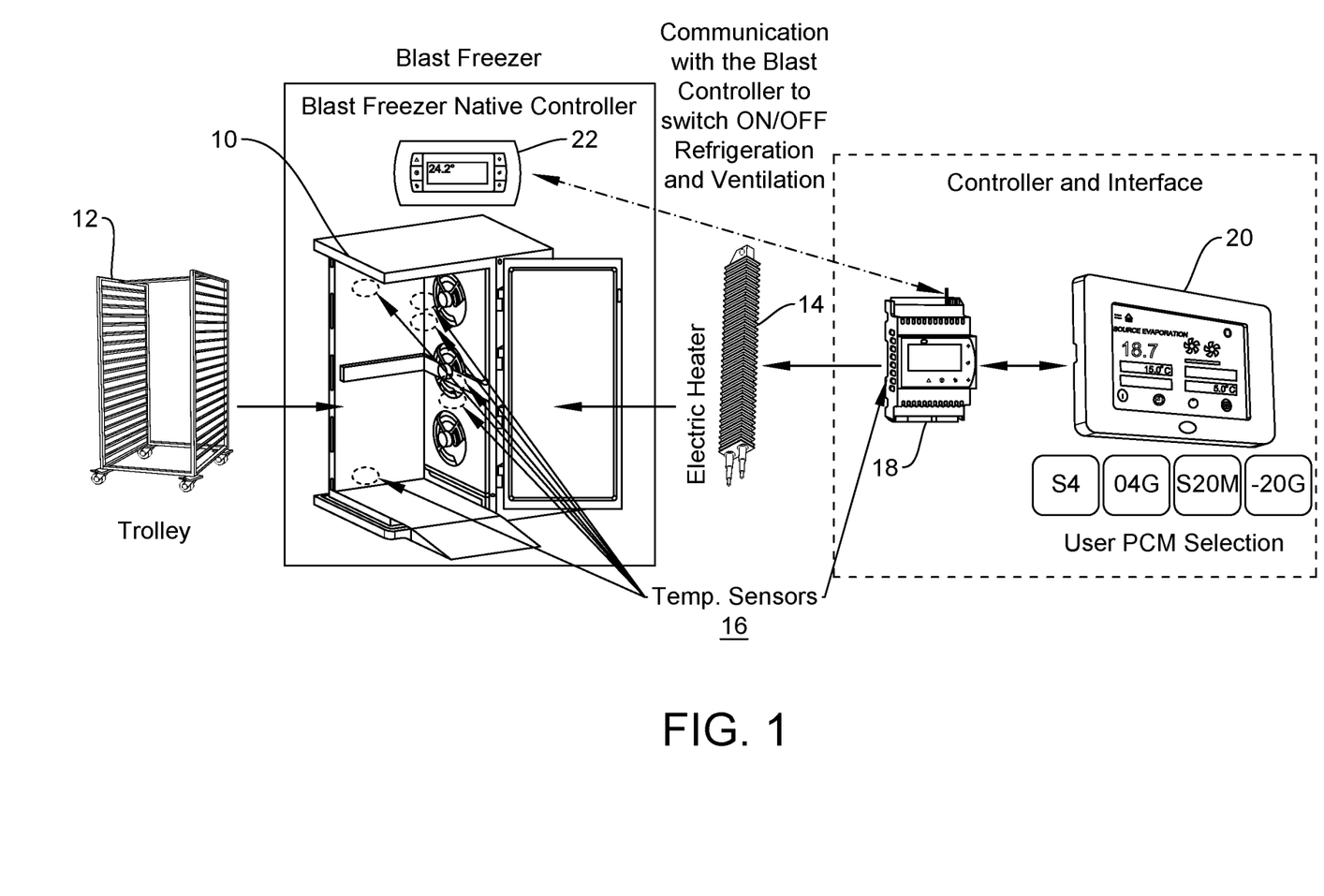
FIG. 1 is a schematic view of blast gel pack conditioning equipment in accordance to an embodiment.

An example of an embodiment of blast gel pack conditioning equipment is shown in FIG. 1 and includes blast gel pack conditioning equipment 10 in which a separate trolley 12, or multiple separate trolleys (not shown), able to hold a large quantity of gel packs may be positioned. The blast gel pack conditioning equipment 10 may include an electric heater 14 and temperature sensors 16 at strategic locations within the blast gel pack conditioning equipment 10. In addition, the blast gel pack conditioning equipment 10 may include a controller 18 and interface 20. The controller 18 may be configured to receive temperature measurements from the sensors 16 and may communicate with a blast freezer native controller 22 of the blast gel pack conditioning equipment 10 and the heater 14 to adjust the temperature of the air within the blast gel pack conditioning equipment 10 and to determine when to switch between phase change processing, freezing, refrigeration, venting, warming, melting, conditioning, and like operations.

The controller 18 may be configured to run software that stores specific details of various recipes (temperature, time, etc.) used to condition gel packs, such as PCM gel packs, and to control the capacity/amount of cooling and heating of the system in order to assure phase change of the PCM material of the gel packs and stabilized temperature across the entire trolley or trolleys 12. The electric heater 14 is used to the warm the air within the blast gel pack conditioning equipment 10, such as during conditioning, and sensors 16 are installed at points within the blast conditioner 10 identified as extremes for various of the phase change processing and conditioning to enable precise control of air temperature within the blast gel pack conditioning equipment 10.

Figure 2:
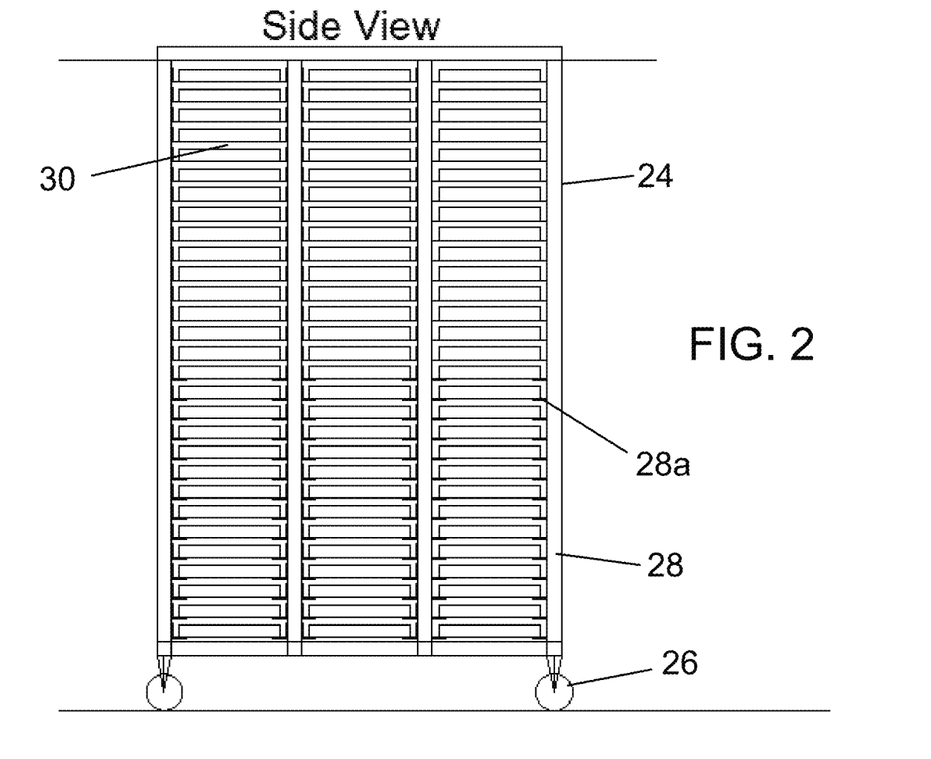
FIG. 2 is a front elevational view of a trolley for supporting gel packs within blast gel pack conditioning equipment in accordance to an embodiment.
Figure 3:
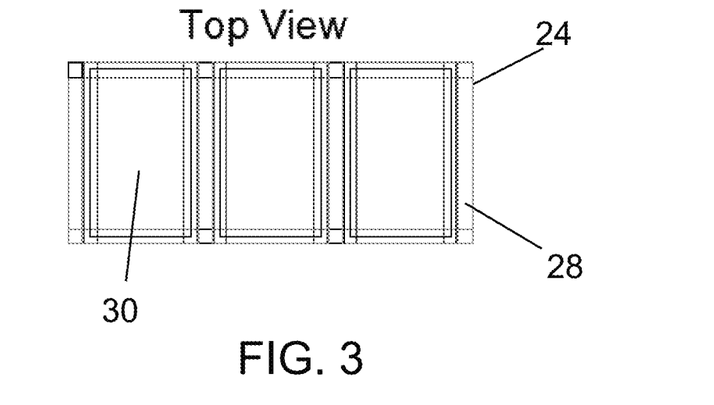
FIG. 3 is a top plan view of the trolley of FIG. 2.

FIGS. 2 and 3 disclose a trolley 24 according to an embodiment. The trolley 24 includes wheels 26 and a support structure 28 including shelves or spaces 30 for receiving and supporting individual gel packs. The brackets 28a for supporting the shelves 30 are spaced to assure appropriate spacing between gel packs to promote even air flow over all gel packs regardless of location throughout the trolley 24. The trolley 24 is of a size that can be located within a void or a trolley-receiving space of a gel pack conditioner as disclosed in greater detail below. Multiple trolleys may be used.

Conventional freezers and like equipment tend to produce lower air flow within top and bottom areas of such equipment which can negatively affect phase change and/or conditioning processes. In addition, a top of conventional equipment that may be used for a heating process may became warmer than the rest of the equipment, and thus may cause gel packs located at the top to melt first. Thus, freezing, chilling, heating, phase change processing, and/or conditioning may vary depending upon the location of a gel pack within the conventional equipment. This lack of homogeneity of conditioning gel packs represents a challenge with respect to assuring the quality of conditioning of PCM gel packs located at the top and bottom of the equipment, in particular, and typically requires a conditioning process to be sufficiently slow to assure the quality of all PCM gel packs being conditioned.

Another problem with conventional equipment is that a section of gel packs located closer to fans or blowers within the conventional equipment may be exposed to higher air flow. Thus, one side of gel packs may freeze faster during a freezing process. However, during a stabilization process, these gel packs may melt before the remaining gel packs.

Figure 4:
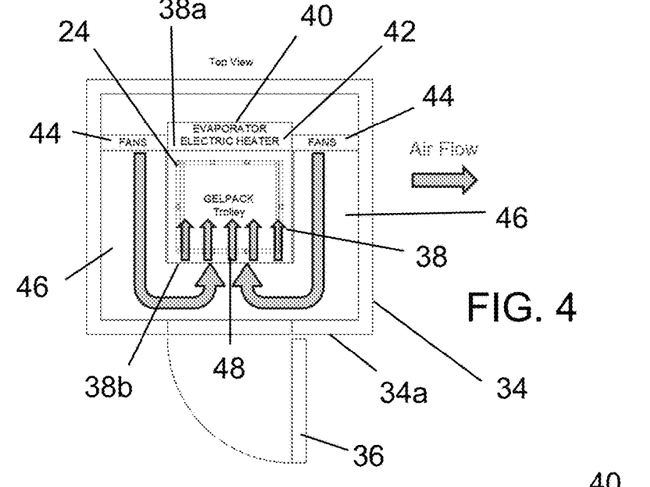
FIG. 4 is cross-sectional view taken horizontally through blast gel pack conditioning equipment in accordance to an embodiment.

FIG. 4 shows blast gel pack conditioning equipment 32 in accordance to an embodiment which is specifically designed to address the above referenced problems. One or more trolleys of gel packs may be located in the blast gel pack conditioning equipment 32, and the blast gel pack conditioning equipment 32 according to an embodiment is configured to increase the homogeneity of air flow and temperature within the volume of a trolley or trolleys, such as trolley 24 supporting gel packs located within the blast gel pack conditioning equipment 32.

Figure 5:
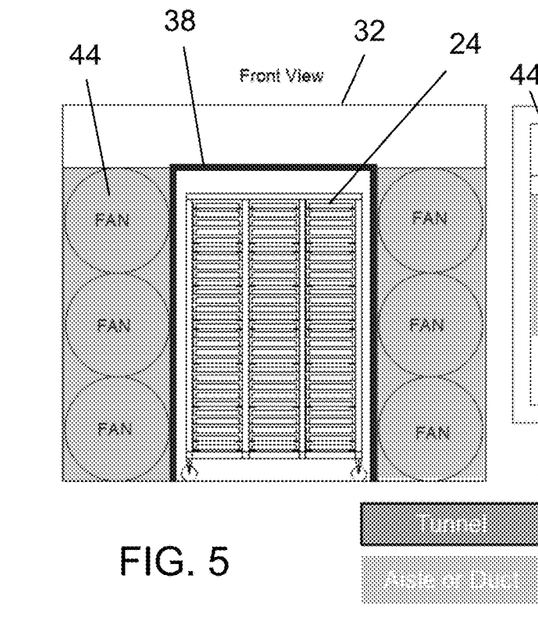
FIG. 5 is a front elevational view of the blast gel pack conditioning equipment of FIG. 3.
Figure 6:
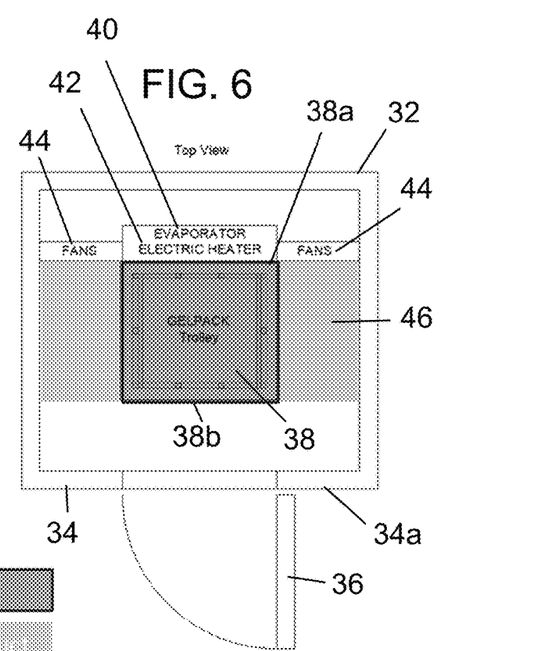
FIG. 6 is a further cross-sectional view of the blast gel pack conditioning equipment of FIG. 4.
Figure 7:
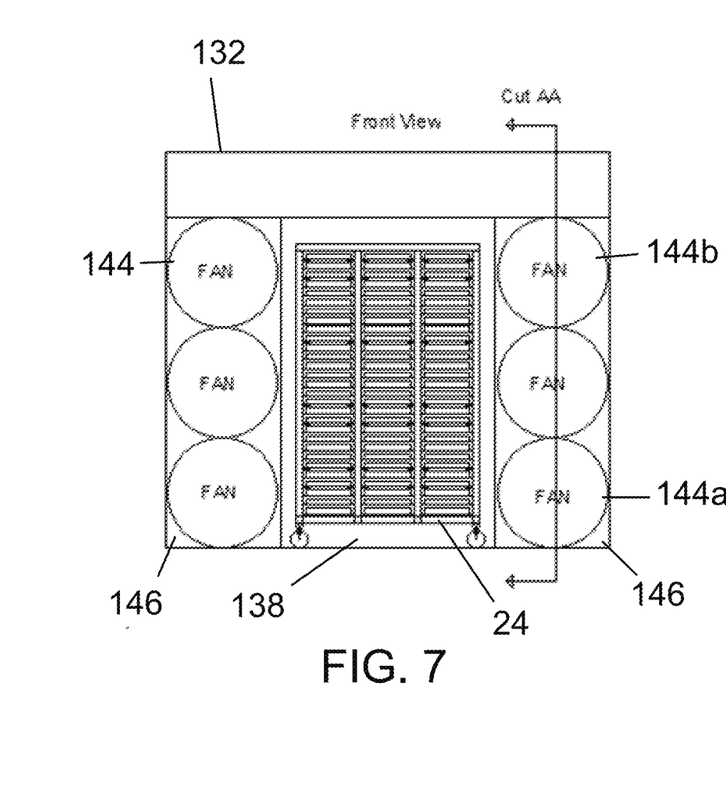
FIG. 7 is a front elevational view of blast gel pack conditioning equipment in accordance to an embodiment.
Figure 8:
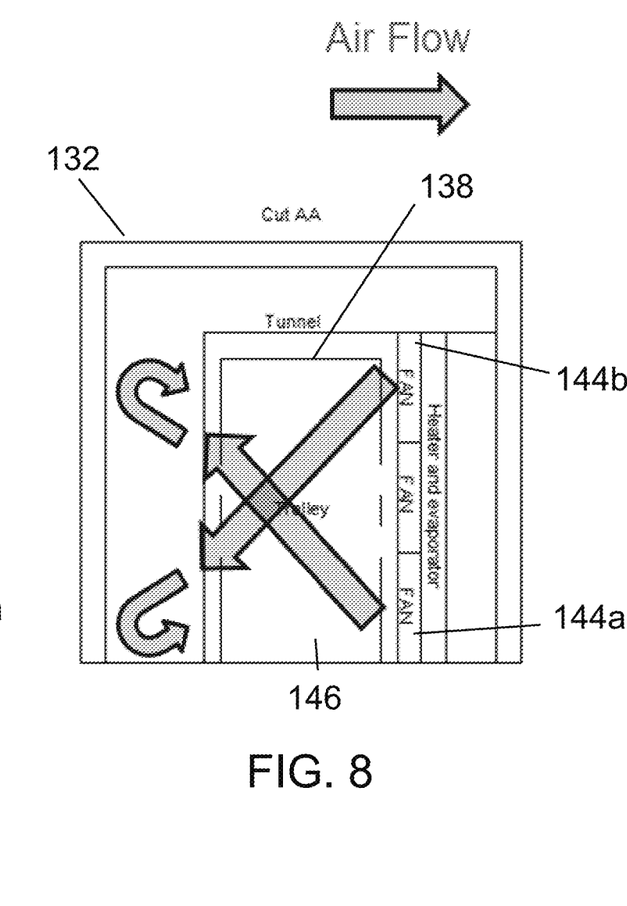
FIG. 8 is a cross-sectional view of the blast gel pack conditioning equipment of FIG. 6 taken along line AA of FIG. 7.
Figure 9:
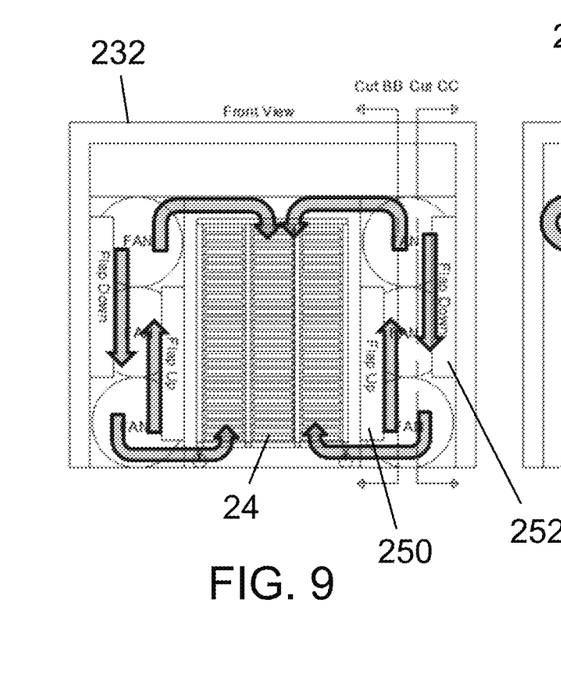
FIG. 9 is a front elevational view of blast gel pack conditioning equipment in accordance to an embodiment.
Figure 10:
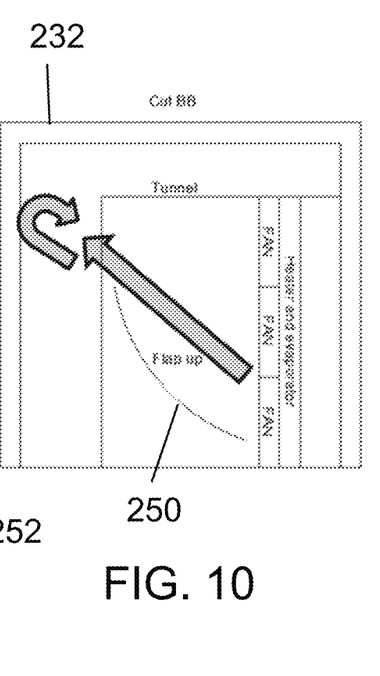
FIG. 10 is a cross-sectional view of the blast gel pack conditioning equipment of FIG. 9 taken along line BB of FIG. 9.
Figure 11:
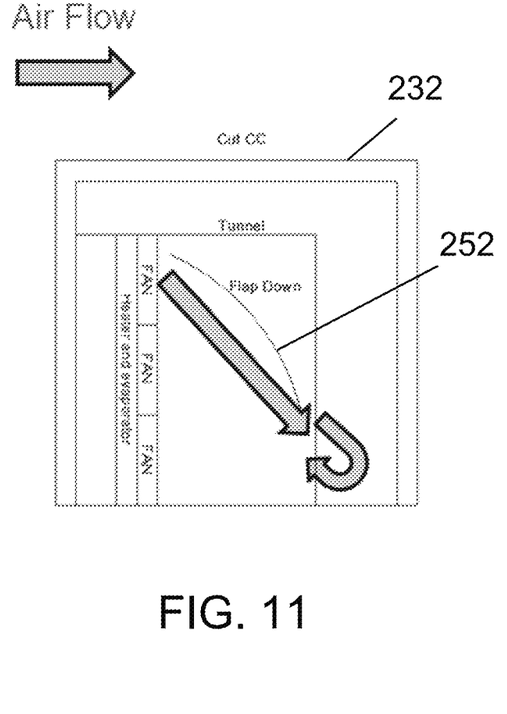
FIG. 11 is a cross-sectional view of the blast gel pack conditioning equipment of FIG. 9 taken along line CC of FIG. 9.

The blast gel pack conditioning equipment 32 shown in FIGS. 4-6 includes an outer housing 34 in which air flow is confined. The housing 34 may be insulated and may include a door 36 at a front 34a of the blast gel pack conditioning equipment 32 aligned with an internal tunnel structure 38 sized for receiving the trolley 24 (or trolleys). The door 36 may be opened to permit entrance or exit of the trolley 24 (or trolleys) and may be closed during a phase change and/or conditioning process. An evaporator 40 for chilling air and an electric heater 42 for heating air within the housing 34 are located adjacent a rear 38a of the tunnel 38 to cool or heat air being circulated through the housing. A set of fans or blowers 44 are located adjacent the rear of the tunnel 38 on opposite lateral sides thereof.

High-speed air flow of cold, chilled, ambient, or heated air within the blast gel pack conditioning equipment 32 is circulated within the housing 34 by the fans 44 through side ducts or aisles 46 within the housing 34 in a direction toward a front of the blast gel pack conditioning equipment 32 external of closed sides of the tunnel 38 and is then directed by the front of the housing 34 into a front opening 38b of the tunnel 38 and through the tunnel 38 to return to the evaporator 40 and heater 42 at the rear 38a of the tunnel 38. Thus, as shown in FIG. 4, the air flow through the trolley 24 is linear air flow 48 laterally across and through the trolley 24 from front to back.

FIGS. 7-11 show additional embodiments of blast gel pack conditioning equipment which are configured to ensure uniformity of temperature of the air flowing at the top and bottom of the tunnel. For example, in FIGS. 7 and 8, the set of fans 144 of blast gel pack conditioning equipment 132 include a lower fan 144a directing air flow toward a top front of the blast gel pack conditioning equipment 132 and an upper fan 144b directing air flow toward a bottom front of the blast gel pack conditioning equipment 132. This ensures that the air flow and temperature of the air flow is mixed within the ducts or aisles 146 before entering the tunnel 138. As an alternative embodiment shown in FIGS. 9-11, flanges or flaps, 250 and 252, may be located within the ducts or aisles 246 on different sides thereof to direct air flow up (see FIG. 10) or down (see FIG. 11) within the duct or aisle 246 of blast gel pack conditioning equipment 232. In either of the above referenced blast gel pack conditioning equipment. 132 and 232, the homogeneity of the temperature of the air circulating within the conditioners, 132 and 232, is improved (i.e., by adjusting an angle of the top and bottom fans, 144a and 144b, to cause mixture of the air flows within a middle section of the duct or aisle 146, or to direct air flow with the use of flanges or flaps, 250 and 252, to cause mixture of the air flows within a middle section of the duct or aisle 246).

Additional problems addressed by some of the embodiments disclosed herein is that after PCM gel packs are phase change processed (for instance, frozen and/or melted) and a conditioning/stabilization process is commenced, there are risks of either warming up or cooling down at least some portions of the gel packs too quickly. For instance, melting of an external perimeter of frozen PCM material inside a gel pack may undesirably reduce the mass of solid PCM material and thereby reduce available latent heat during use in shipment. For purposes of avoiding this effect, embodiments of blast gel pack conditioning equipment are provided in which temperature sensors of a particular construction and arrangement are used.

Figure 12:
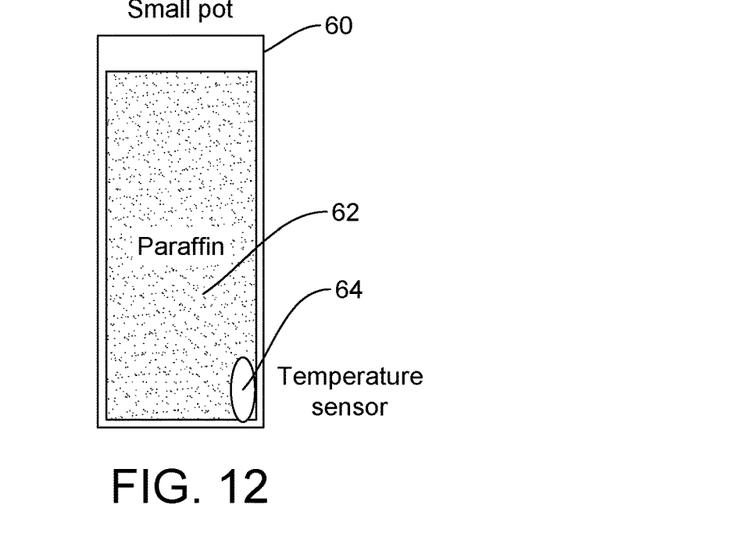
FIG. 12 is a schematic view of a temperature sensor in accordance to an embodiment.
Figure 13:
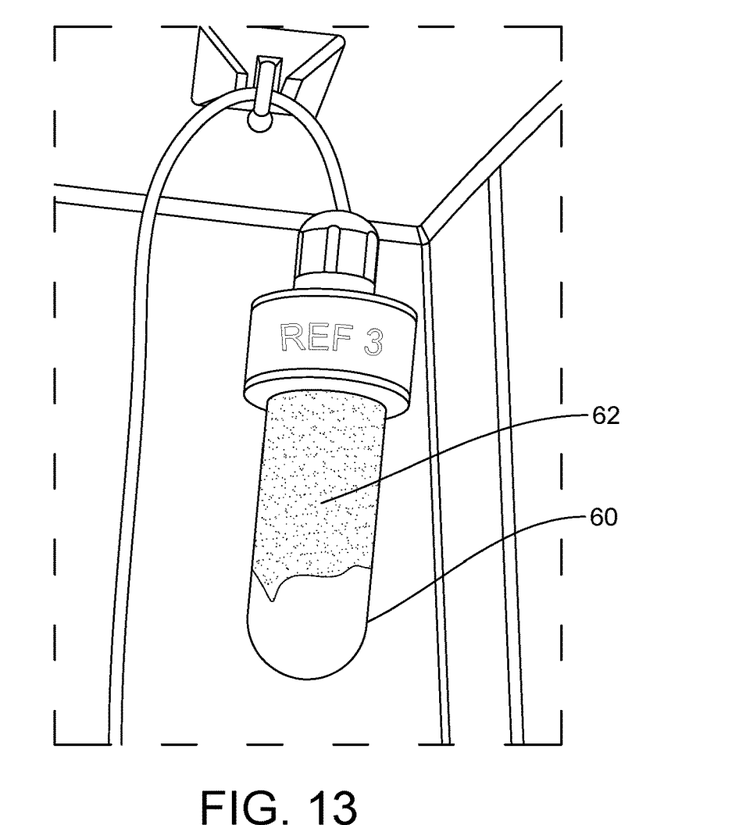
FIG. 13 is a perspective view of a temperature sensor in accordance to an embodiment.

According to an embodiment, at least some of the temperature sensors within blast gel pack conditioning equipment may be constructed in the form of small pots or pot-shaped containers 60 filled with paraffin 62 or other waxy substance having a melting temperature, for instance, of about +50° C. (about 120° F.). Consequently, the paraffin 62 remains solid at all times (during cooling and heating) as a maximum temperature of the gel pack conditioner may be limited to about +40° C. (104° F.). A temperature sensor 64 is located within the pot 60 at an outer edge of the paraffin for purposes of mimicking a temperature at the edge of PCM material within a gel pack. This permits the controller and software of the blast gel pack conditioning equipment to appropriately limit heating and cooling operations to within acceptable ranges within the blast gel pack conditioning equipment.

According to an embodiment, the sensors with paraffin are located at positions within the blast gel pack conditioning equipment that would represent specifically-defined risks for gel pack conditioning in each step of a conditioning process. For example, these positions are shown in the blast gel pack conditioning equipment 332 in FIG. 14 and may include: P1—Air Insufflation (hottest point when heating/front of the tunnel); P2—Air return (represents the effect of the air after exchanging heat with the PCM gel packs/rear of the tunnel), P3—Top (hottest point when heating/top of tunnel); and P4—Bottom (lowest point of heat exchange when freezing/bottom of tunnel).

Figure 14:
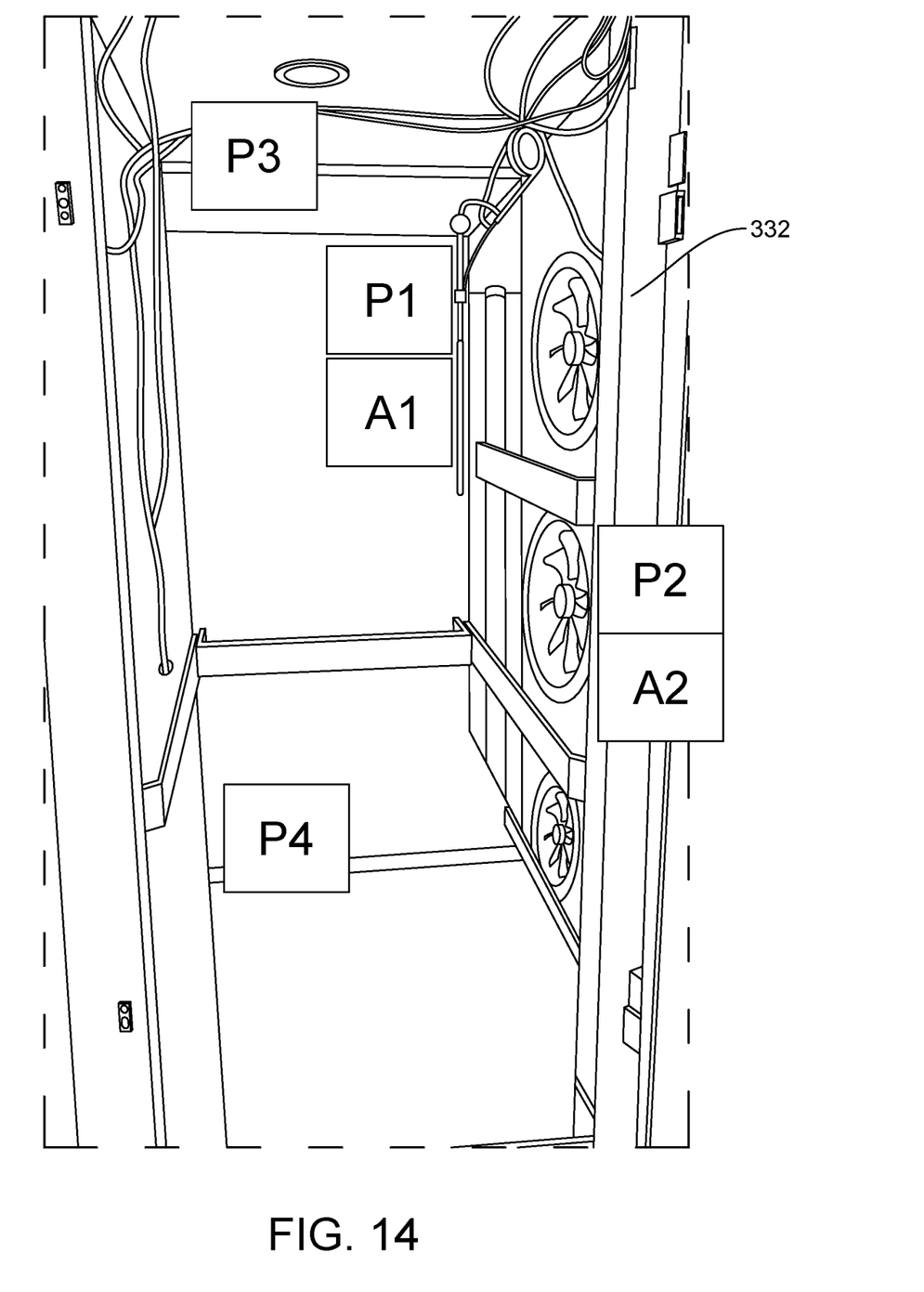
FIG. 14 is an image of blast gel pack conditioning equipment in accordance to an embodiment.

According to an embodiment, the blast gel pack conditioning equipment 332 may include additional temperature sensors that are exposed directly to the air in the blast gel pack conditioning equipment (i. e., that are not located in pots or embedded within paraffin). These additional temperature sensors provide fast-response sensors for the purpose of avoiding excess heating or cooling during a stabilization process. By way of example, the positions of these fast-response sensors may include: A1—Air Insufflation (hottest point when heating/front of tunnel); and A2—Air return (represents the effect of the air after exchanging heat with the PCM gel packs/rear of the tunnel).

According to an embodiment, the software of the controller of the blast gel pack conditioning equipment 332 receives temperature measurements from the sensors and calculates an average temperature value from measurements taken by the sensor at P1 (i.e., air insufflation—hottest point when heating/front of tunnel) and the sensor at P2 (i.e., air return—the air after exchanging heat with the PCM gel packs/rear of tunnel) to enable cooling or heating during the stabilization process. For instance, provided the average value falls within a pre-set range or above or below pre-set thresholds, cooling or heating may be permitted to continue. The software of the controller of the blast gel pack conditioning equipment 332 may also calculate an average temperature value from measurements taken by the sensor at A1 (i. e., air insufflation —hottest point when heating/front of tunnel) and the sensor at A2 (i.e., air return—the air after exchanging heat with the PCM gel packs/rear of tunnel) to disable or discontinue heating or cooling to avoid excess of heating and cooling that would ultimately affect the temperatures at P1 and P2. For instance, if the average value reaches a pre-set threshold, cooling or heating may be discontinued or the temperature may be adjusted accordingly.

The sensor at P3 (top) is used to limit the heating process as it may read temperature higher than the sensor at P1 (i.e., air insufflation—hottest point when heating) at some stages of conditioning. Thus, if the measurement at P3 reaches a pre-set threshold, the temperature during a heating process may be automatically reduced by a predetermined amount. The sensor at P4 (bottom) is used to assure phase change of the PCM material at a location with lowest heat exchange capacity. Thus, if the measurement at P4 falls to a pre-set threshold, the temperature during a heating or cooling phase change process may be automatically increased by a predetermined amount.

According to an embodiment, the software of the controller of the blast gel pack conditioning equipment may also be configured to control the freezing phase change process of gel packs by integrating the delta or variation in temperature below phase change temperature of the PCM material using temperature readings from the paraffin sensors (P1, P2, P3 and P4) as considered extreme temperatures of the edges of the gel packs. About every 60 seconds the software may add to the accumulated integral of each paraffin sensor the delta temperature between paraffin temperature and the phase change point of the PCM material being conditioned. Thus, the freezing phase change process time is proportional to the delta temperature. When the integral calculation of each paraffin temperature sensor reaches a set-point, all PCM gel packs are considered to be frozen and the next step of the recipe can be started (i.e., conditioning).

Figure 15:
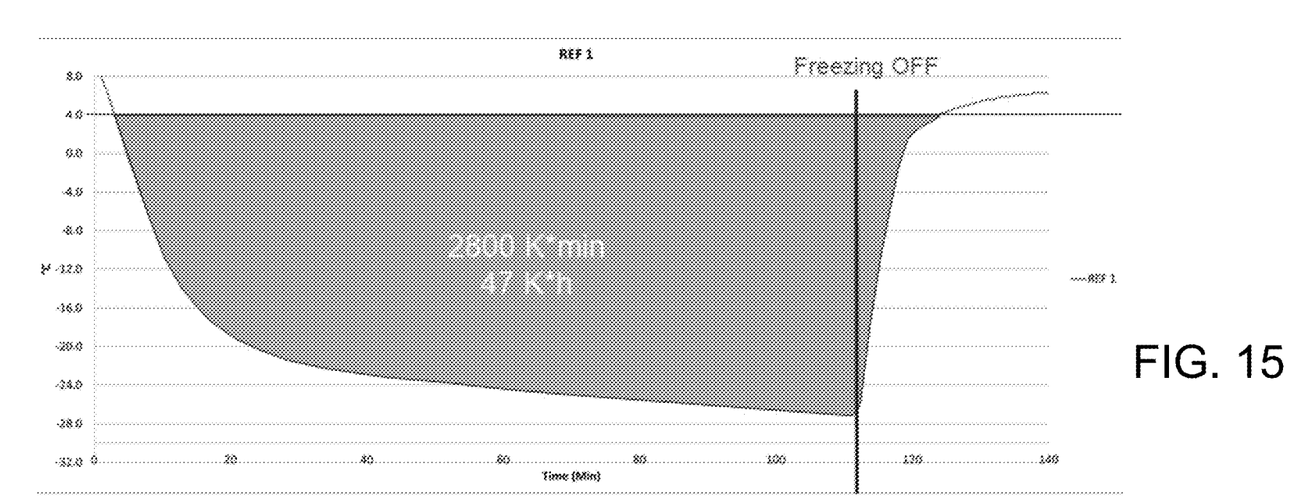
FIG. 15 is a graph of freezing temperature as controlled in accordance to an embodiment.
Figure 16:
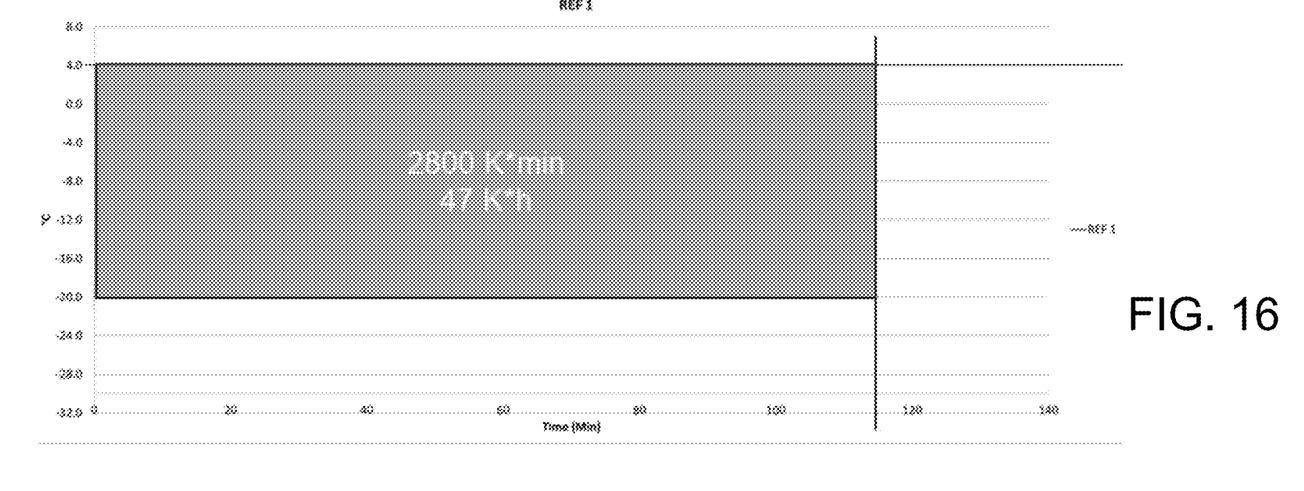
FIG. 16 is a graph of freezing temperature set at a constant value.

The graph shown in FIG. 15 provides an example in which the integral of a paraffin sensor as discussed above reaches the value of 2,800 K*min in about 110 minutes. In contrast, the graph shown in FIG. 16 provides a comparative example in which the value of 2,800 K*min would be achieved in 120 minutes when the temperature is simply fixed at −20° C. These examples consider the phase change point as +4° C. Thus, by controlling freezing temperature as shown in FIG. 15, the time required for the freezing phase change process may be reduced by about 10 minutes in comparison with the process shown in FIG. 16.

The controller for carrying out any of the above disclosed embodiments, methods, or arrangements may include software or the like provided on a circuit board or within another electronic device and can include various routers, modems, processors, microprocessors, modules, units, components, controllers, chips, disk drives, and the like. It will be apparent to one of ordinary skill in the art that systems, modules, components, units, processors, servers, and the like may be implemented as electronic components, software, hardware or a combination of hardware and software for purposes of providing a system.

While the principles of the invention have been described above regarding specific devices, apparatus, systems, and/or methods, it is to be clearly understood that this description is made only by way of example and not as limitation. One of ordinary skill in the art will appreciate that various modifications and changes can be made without departing from the scope of the claims below.

The above description illustrates various embodiments along with examples of how aspects of particular embodiments may be implemented, and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims.

The invention claimed is:

1. Automated blast gel pack conditioning equipment for phase change processing and conditioning gel packs, comprising:
   a housing including an evaporator for cooling air and a heater for heating air within the housing and defining a void space for containing a set of gel packs;
   at least one fan for circulating air within the housing such that a path of air flow extends through an air insufflation end to an air return end within the housing;
   at least one temperature sensor located within the housing, wherein the at least one temperature sensor includes at least one temperature sensor contained within a pot-shaped container filled with paraffin; and
   a controller for receiving temperature measurements from the at least one temperature sensor and for automatically controlling operation of the evaporator, heater, and at least one fan within the housing during phase change processing and conditioning of gel packs.

2. The automated blast gel pack conditioning equipment according to claim 1, wherein the housing includes a tunnel structure for defining the void space for containing a set of gel packs and for defining the air insufflation and return ends, and wherein the path of air flow extends through an opening at the air insufflation end of the tunnel structure to the air return end of the tunnel structure opposite the air insufflation end.

3. The automated blast gel pack conditioning equipment according to claim 2, further comprising a trolley on which the set of gel packs are supported at spaced positions within the trolley, wherein the trolley is located within the tunnel structure and the path of air flow passes through the trolley.

4. The automated blast gel pack conditioning equipment according to claim 2, wherein the evaporator and heater are located adjacent the air return end of the tunnel structure.

5. The automated blast gel pack conditioning equipment according to claim 4, wherein the at least one fan is located adjacent the air return end of the tunnel structure for forcing air flow from the evaporator and heater along an exterior side of the tunnel structure to the opening at the air insufflation end of the tunnel structure.

6. The automated blast gel pack conditioning equipment according to claim 5, wherein the at least one fan includes an upper fan directing air flow in a downward direction and a lower fan directing air flow in an upward direction to cause mixing of the air flow before the air flow enters the opening at the air insufflation end of the tunnel structure.

7. The automated blast gel pack conditioning equipment according to claim 5, further comprising air flaps adjacent an exterior side of the tunnel structure for directing air flow in a downward direction and an upward direction to cause mixing of the air flow before the air flow enters the opening at the air insufflation end of the tunnel structure.

8. The automated blast gel pack conditioning equipment according to claim 1, wherein the at least one temperature sensor contained within the pot-shaped container is positioned against an inner wall of the pot shaped container on an outer periphery of the paraffin.

9. The automated blast gel pack conditioning equipment according to claim 2, wherein the at least one temperature sensor includes a first temperature sensor contained within a pot-shaped container filled with paraffin and located adjacent said air insufflation end of said tunnel structure, a second temperature sensor contained within a pot-shaped container filled with paraffin and located adjacent said air return end of said tunnel structure, a third temperature sensor contained within a pot-shaped container filled with paraffin and located adjacent a top of said tunnel structure, and a fourth temperature sensor contained within a pot-shaped container filled with paraffin and located adjacent a bottom of said tunnel structure.

10. The automated blast gel pack conditioning equipment according to claim 9, wherein the at least one temperature sensor includes a temperature sensor directly exposed to the air flow adjacent the air insufflation end of the tunnel structure and a temperature sensor directly exposed to the air flow adjacent the air return end of the tunnel structure.

11. The automated blast gel pack conditioning equipment according to claim 10, wherein the controller is configured to determine an average temperature value calculated from measurements taken by the temperature sensors directly exposed to the air flow adjacent the air insufflation end and air return end of the tunnel structure and to discontinue cooling or heating during a stabilization process of gel packs within the gel pack conditioner if the average temperature value reaches a pre-set threshold.

12. The automated blast gel pack conditioning equipment according to claim 9, wherein the controller is configured to determine an average temperature value calculated from measurements taken by the first and second temperature sensors to enable cooling or heating during a stabilization process of gel packs within the gel pack conditioner if the average temperature value falls within a pre-set range.

13. The automated blast gel pack conditioning equipment according to claim 9, wherein the controller is configured to compare a temperature measurement by the third temperature sensor to a pre-set threshold and to reduce heating if the temperature measurement reaches the pre-set threshold.

14. The automated blast gel pack conditioning equipment according to claim 9, wherein the controller is configured to compare a temperature measurement by the fourth temperature sensor to a pre-set threshold and to increase heating if the temperature measurement falls to a level of the pre-set threshold.

15. The automated blast gel pack conditioning equipment according to claim 9, wherein the controller is configured to control freezing of gel packs by calculating a value by integrating a delta in temperature below phase change temperature of PCM material of the gel packs being conditioned using temperature readings from at least one of the first, second, third or fourth temperature sensors and periodically adding the value to an accumulated integral of delta temperature so that freezing time is proportional to the delta temperature.

16. The automated blast gel pack conditioning equipment according to claim 1, wherein the heater is an electric heater and the gel packs are phase change material (PCM) gel packs.

17. A method of automatically phase change processing and conditioning gel packs, comprising the steps of:
phase change processing a set of gel packs within blast gel pack conditioning equipment; and
immediately following said phase change processing step, without removing the set of gel packs from the blast gel pack conditioning equipment, conditioning the set of gel packs to a pre-determined temperature;
wherein the blast gel pack conditioning equipment includes a housing with an evaporator for cooling air and heater for heating air within the housing and defining a void space for containing the set of gel packs, at least one fan for circulating air within the housing such that a path of air flow extends through an air insufflation end to an air return end within the housing, at least one temperature sensor located within the housing, wherein the at least one temperature sensor includes at least one temperature sensor contained within a pot-shaped container filled with paraffin, and a controller for automatically receiving temperature measurements from the at least one temperature sensor and for automatically controlling operation of the evaporator, heater, and at least one fan within the housing during said phase change processing and conditioning steps.

18. The method according to claim 17, wherein the set of gel packs includes phase change material (PCM) gel packs, and wherein, during said phase change processing step, the controller controls freezing of the PCM gel packs by calculating a value by integrating a delta in temperature below phase change temperature of PCM material of the PCM gel packs using temperature readings from the at least one temperature sensor contained within a pot-shaped container filled with paraffin and periodically adding the value to an accumulated integral of delta temperature so that freezing time is proportional to the delta temperature.

19. The method according to claim 17, wherein, during said conditioning step, the controller is configured to determine an average temperature value calculated from measurements taken by a temperature sensor directly exposed to the air flow adjacent the air insufflation end and a temperature sensor directly exposed to the air flow adjacent the air return end of the tunnel structure and to automatically discontinue cooling or heating of the set of gel packs if the average temperature value reaches a pre-set threshold.

20. The method according to claim 17, wherein the housing includes a tunnel structure defining the air insufflation and return ends, wherein the at least one temperature sensor includes a first temperature sensor contained within a pot-shaped container filled with paraffin and located adjacent said air insufflation end of said tunnel structure, and a second temperature sensor contained within a pot-shaped container filled with paraffin and located adjacent said air return end of said tunnel structure, and wherein the controller is configured to determine an average temperature value calculated from measurements taken by the first and second temperature sensors to enable cooling or heating to continue during said stabilizing step only if the average temperature value falls within a pre-set range.

21. The method according to claim 17, wherein the housing includes a tunnel structure defining the air insufflation and return ends, wherein the at least one temperature sensor includes a temperature sensor contained within a pot-shaped container filled with paraffin and located adjacent a top of said tunnel structure, and wherein, during said stabilizing step, the controller is configured to compare a temperature measurement by the temperature sensor to a pre-set threshold and to automatically reduce heating temperature if the temperature measurement reaches the pre-set threshold.

22. The method according to claim 17, wherein the housing includes a tunnel structure defining the air insufflation and return ends, wherein the at least one temperature sensor includes a temperature sensor contained within a pot-shaped container filled with paraffin and located adjacent a bottom of said tunnel structure, and wherein, during said stabilizing step, the controller is configured to compare a temperature measurement by the temperature sensor to a pre-set threshold and to increase heating if the temperature measurement falls to a level of the pre-set threshold.

\* \* \* \* \*